F. S. CARR.
TURN BUTTON FASTENER.
APPLICATION FILED JAN. 29, 1918.
1,287,220.
Patented Dec. 10, 1918.
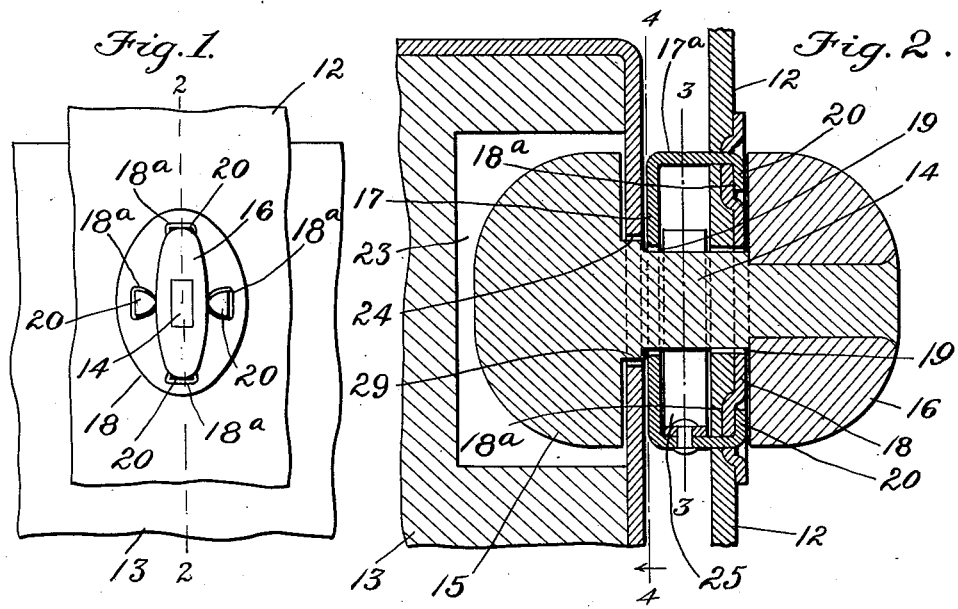
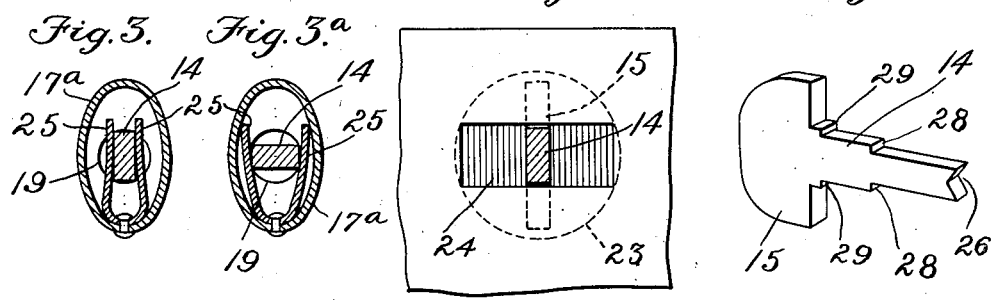
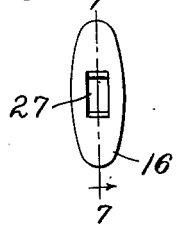
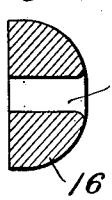
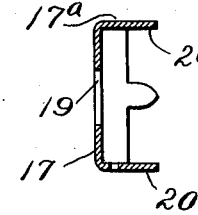
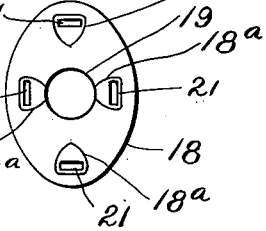
Inventor
Fred S. Carr
by Wright Brown Quimby & May
Attorneys

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

TURN-BUTTON FASTENER.

1,287,220.

Specification of Letters Patent.

Patented Dec. 10, 1918.

Application filed January 29, 1918. Serial No. 214,290.

*To all whom it may concern:*

Be it known that I, FRED S. CARR, a citizen of the United States, residing at Newton, in the county of Middlesex and State of Massachusetts, have invented new and useful Improvements in Turn-Button Fasteners, of which the following is a specification.

This invention relates to turn-button fasteners located on a carrying part, such as a flexible curtain, or other flexible member of a vehicle top, and adapted to engage an anchoring part, which may be a rigid part of the vehicle body, the function of the fastener being to secure the flexible carrying part to the anchoring part.

The object of the invention is to provide a turn-button fastener adapted to be conveniently applied to a flexible carrying part and adjusted to secure and release said part, and to secure the latter to the rigid anchoring part without the employment of projecting means on the anchoring part liable to catch and tear clothing, and do other damage.

The invention is embodied in the improvements which I will now proceed to describe and claim.

Of the accompanying drawings forming a part of this specification,—

Figure 1 is a side elevation showing portions of a flexible carrying part and a rigid anchoring part, the carrying part being provided with a fastener embodying the invention.

Fig. 2 is an enlarged section on line 2—2 of Fig. 1.

Fig. 3 is a section on line 3—3 of Fig. 2.

Fig. 3ᵃ is a view similar to Fig. 3, showing a different adjustment.

Fig. 4 is a section on line 4—4 of Fig. 2, and an elevation of parts at the left of said line.

Fig. 5 is a perspective view of the shank and button hereinafter described.

Fig. 6 is an end view of the handle piece, hereinafter described.

Fig. 7 is a section on line 7—7 of Fig. 6.

Fig. 8 is a sectional view of the flanged plate forming a part of the bearing hereinafter described.

Fig. 9 is a side view of the slotted plate forming another part of said bearing.

The same reference characters indicate the same parts in all the figures.

In the drawings, 12 represents a flexible carrying part, which may be part of a curtain, or other flexible member of a top of an automobile or other vehicle. 13 represents a rigid anchoring part, which may be a portion of the body of the vehicle.

The carrying part 12 is provided with a holder having a bearing in which is mounted to rotate the journal portion of a rotatable member composed of a shank 14, a button 15 fixed to one end of the shank, and a handle piece 16 fixed to the opposite end of the shank.

In the embodiment of the invention here shown, the holder is composed of two plates 17 and 18, each having a circular orifice 19, said orifices being in alinement with each other, and their walls constituting bearing surfaces supporting and permitting the rotation of the journal portion of the shank 14.

As best shown by Fig. 8, the plate 17 is preferably provided with a flange 17ᵃ on which are formed flexible prongs 20. The plate 17 is adapted to be seated on one side of the carrying part 12 by the bearing of the outer edge of the flange on said carrying part, and the prongs 20 are adapted to pass through said part and to be clenched on one side of the plate 18, the latter being seated on the opposite side of the carrying part and provided with slots 21 adapted to receive the prongs 20. The plate 18 is therefore a clenching plate on which the prongs 20 are clenched as shown by Figs. 1 and 2, the carrying part being clamped between the plates constituting the holder. Said plates are spaced apart so that the orifices 19 collectively constitute an elongated bearing adapted to prevent the shank from being inclined relatively to the holder.

The anchoring part 13 is provided with a socket or cavity 23, formed to receive and permit the rotation of the button 15. The socket 23 is provided with an oblong mouth 24, which is narrower than the socket in one direction, as indicated by Fig. 4. The button 15 is of oblong form, as indicated by Fig. 5, and is adapted when turned in a horizontal position, to pass freely through the socket mouth 24, and when turned to a vertical position, to engage the front wall of the socket above and below the mouth 24, as shown by Figs. 2 and 4. The holder is spaced from the inner edge of the button to accommodate a portion of the wall of the socket 23, as shown by Fig. 2.

The holder plate 17 and its flange 17ª form walls of a chamber or casing, adapted to receive registering means coöperating with the shank 14 to yieldingly hold the button 15 in different positions, that is, in a horizontal position permitting its entrance into the socket mouth, and in the vertical position shown by Figs. 2 and 4. I have embodied the registering means in spring jaws 25, suitably secured in the said casing, and adapted to bear yieldingly on opposite sides of the shank 14, said sides being flat to furnish a wide bearing for the jaws. When the button 15 stands vertically, the jaws are as indicated by Fig. 3, and when the button stands horizontally, the jaws are as indicated by Fig. 3ª.

The shank 14 and button 15 are preferably integral with each other and struck up by suitable dies from a flat metal sheet, bar, or plate, the shank including a journal portion adapted to turn in the bearing, and an extension formed to pass through the bearing and project from the outer side of the holder. The outer end of said extension is adapted to be spread or enlarged to secure the handle piece 16 to the shank. For this purpose the said outer end may be notched, as indicated at 26 (Fig. 5).

The handle piece is provided with an opening 27 enlarged at its outer end and formed to receive and closely fit the shank extension. When the handle piece is placed upon the shank and abutted against outer shoulders 28 formed thereon, the notched outer end of the shank extension may be upset or enlarged, as indicated by Fig. 2, to engage the enlarged end of the opening 27 and securely confine the handle piece in place. Provision is therefore made for interengaging the shank and handle after the insertion of the shank in the bearing, so that the parts may be conveniently assembled. The handle piece is preferably of oblong form, as indicated by Figs. 1 and 6, and is arranged with its major axis in the same plane with the major axis of the button 15, so that the handle piece, which is located at the outer side of the carrying part 12, indicates by its angular position the angular position of the button which is not visible from the outer side of the carrying part.

The portions of the plate 18 containing the slots 21 may be embossed to form depressions 18ª (see Fig. 2), adapted to receive the clenched portions of the prongs 20, so that the outer sides of the said clenched portions are flush with the outer side of the plate 18 and do not obstruct the turning of handle 16. The inner end of the handle 16 may therefore bear on the plate 18 to prevent endwise movement of the rotatable member in one direction. The shank 14 may be provided with inner shoulders 29 adapted to bear on the outer side of the plate 17, and thus prevent endwise movement of the rotatable member in the opposite direction; the shoulders 29 constituting means for spacing the holder from the inner edge of the button.

I claim:

1. A turn button fastener comprising a rotatable element including a shank, a button fixed to one end of the shank, and a handle fixed to the opposite end of the shank and spaced from the button by a journal portion of the shank, and a holder for said rotatable element attachable to a flexible carrying part, spaced from the inner edge of the button to accommodate a portion of a socket wall, and provided with a bearing for said journal portion, the shank and handle being formed to be interengaged after the insertion of the shank in the bearing.

2. A turn-button fastener comprising a holder attachable to a flexible carrying part and provided with a bearing, and a rotatable member including an oblong button, a shank fixed thereto and projecting from the inner edge of the button, said shank having a journal portion formed to enter and turn in said bearing, and an extension formed to pass through the bearing and project from the outer side of the holder, stop means being provided for spacing the inner edge of the button from the holder to accommodate a portion of a socket wall, and a handle piece adapted for engagement with the shank extension and constituting a stop member coöperating with the outer side of the holder.

3. A turn-button fastener comprising a holder attachable to a flexible carrying part and provided with a bearing, and a rotatable member including an oblong button, a shank fixed thereto and projecting from the inner edge of the button, said shank having inner shoulders constituting stops coöperating with the holder to limit outward endwise movement of the rotatable member, and to space the inner edge of the button from the holder and thus accommodate a portion of a socket wall, a journal portion formed to enter and turn in said bearing, shoulders at the outer end of the journal portion and constituting handle stops, and an extension formed to pass through the bearing and project from the outer side of the holder, and a handle adapted for engagement with said extension and confined against inward movement by said stops, said handle constituting a stop coöperating with the holder to limit inward endwise movement of the rotatable member.

4. A turn-button fastener comprising a rotatable element including a shank, a button fixed to one end of the shank, and a handle fixed to the opposite end of the shank and spaced from the button by a journal portion of the shank, and a holder for said rotatable element, composed of two plates adapted to be clamped against opposite sides of a flexible carrying part, and provided with spaced apart alined orifices constituting an elongated bearing in which said journal portion is rotatable, the holder being spaced from the inner edge of the button to accommodate a portion of a socket wall.

5. A turn-button fastener comprising a shank, a holder composed of spaced apart plates having alined orifices constituting a bearing through which the shank extends and in which it is rotatable, one of said plates being adapted to be seated on one side of a carrying part, and having prongs adapted to pass through said part, the other plate being adapted to be seated on the opposite side of the carrying part and having slots to receive said prongs, a button fixed to the shank at one side of the holder, and a handle fixed to the shank at the opposite side of the holder.

6. A turn-button fastener comprising a shank, a holder composed of spaced apart plates having alined orifices constituting a bearing through which the shank extends and in which it is rotatable, one of said plates having a flange adapted to bear on one side of a carrying part, and prongs on said flange adapted to pass through the carrying part, the other plate being adapted to bear on the opposite side of the carrying part and having slots to receive said prongs, a button fixed to the shank at one side of the holder, and a handle fixed to the shank at the opposite side of the holder.

7. A turn-button fastener comprising a shank, a holder composed of spaced apart plates having alined orifices constituting a bearing through which the shank extends and in which it is rotatable, one of said plates having a flange adapted to bear on one side of a carrying part, and prongs on said flange adapted to pass through the carrying part, the other plate being adapted to bear on the opposite side of the carrying part and having slots to receive said prongs, resilient registering jaws located in the space surrounded by said flange and adapted to bear on opposite sides of the shank and yieldingly confine the latter in different positions, a button fixed to the shank at one side of the holder, and a handle fixed to the shank at the opposite side of the holder.

8. A turn-button fastener comprising a holder attachable to a carrying part and provided with a bearing, and a rotatable element including a button, a shank integral with the button and provided with inner shoulders spaced from the inner edge of the button to bear on one side of the holder, the shank being formed to project through the bearing and adapted to be upset at its outer end, and provided with outer shoulders adjacent to said notched end, and a handle having an orifice formed to receive the projecting portion of the shank and enlarged at one end to be engaged by the upset end of the shank, said handle constituting a stop member adapted to bear on the opposite side of the holder.

In testimony whereof I have affixed my signature.

FRED S. CARR.